(12) United States Patent  (10) Patent No.: US 11,971,768 B2
Syouda  (45) Date of Patent: Apr. 30, 2024

(54) POWER SUPPLY CONTROL DEVICE, POWER SUPPLY DEVICE, AND POWER SUPPLY CONTROL METHOD

(71) Applicant: Yazaki Corporation, Tokyo (JP)

(72) Inventor: Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 27 days.

(21) Appl. No.: 17/882,146

(22) Filed: Aug. 5, 2022

(65) Prior Publication Data

US 2023/0055981 A1  Feb. 23, 2023

(30) Foreign Application Priority Data

Aug. 18, 2021  (JP) .................... 2021-133412

(51) Int. Cl.
*G06F 1/32* (2019.01)
*G06F 1/3212* (2019.01)
*G06F 1/3296* (2019.01)
*G06F 1/3203* (2019.01)

(52) U.S. Cl.
CPC .......... *G06F 1/3212* (2013.01); *G06F 1/3296* (2013.01); *G06F 1/3203* (2013.01)

(58) Field of Classification Search
CPC ........ G06F 1/3212; G06F 1/3296; H02J 7/04; H02J 2310/40; H02J 7/0013; H02J 7/00714; H02J 7/342; H02J 7/0048; Y02E 60/10
USPC ........................................................ 713/320
See application file for complete search history.

(56) References Cited

U.S. PATENT DOCUMENTS

| | | | | |
|---|---|---|---|---|
| 5,856,918 | A * | 1/1999 | Soneda | H02M 3/07 363/60 |
| 9,106,104 | B2 * | 8/2015 | Kinjo | H01M 10/443 |
| 9,735,619 | B2 * | 8/2017 | Inoue | H02J 7/00306 |
| 2001/0003433 | A1 * | 6/2001 | Hu | H03F 3/604 330/132 |
| 2005/0052221 | A1 * | 3/2005 | Kohnotoh | H02J 7/345 327/536 |
| 2010/0321040 | A1 * | 12/2010 | Takeuchi | H01G 9/14 324/659 |

(Continued)

FOREIGN PATENT DOCUMENTS

| | | |
|---|---|---|
| JP | 2004-56937 A | 2/2004 |
| JP | 2008-118828 A | 5/2008 |
| JP | 2016-77124 A | 5/2016 |

*Primary Examiner* — Volvick Derose
(74) *Attorney, Agent, or Firm* — Sughrue Mion, PLLC (57) ABSTRACT

A power supply control device controls charging and discharging of a power supply device including a plurality of power supply units which are connected in parallel to a load and a power generation unit. The power supply control device has relationship information indicating a relationship among a discharge current flowing from the power supply device to the load, a discharge current ratio that is a ratio of output currents of the plurality of power supply units, and a power loss of the power supply device, acquires a measured value of the discharge current, obtains, from the relationship information, the discharge current ratio at which the power loss of the power supply device corresponding to the acquired measured value of the discharge current is minimized, and adjusts the discharge current ratio so as to match with the discharge current ratio obtained from the relationship information.

8 Claims, 9 Drawing Sheets

(56) References Cited

U.S. PATENT DOCUMENTS

| | | | | |
|---|---|---|---|---|
| 2012/0091801 | A1* | 4/2012 | Koshin | H02J 7/35 307/24 |
| 2014/0197686 | A1* | 7/2014 | Hiramura | H02J 7/0019 307/29 |
| 2015/0321575 | A1* | 11/2015 | Sakatani | H02J 7/1423 320/109 |
| 2015/0331472 | A1* | 11/2015 | Iwamoto | G06F 1/3212 713/323 |
| 2017/0018921 | A1* | 1/2017 | Tomura | H02M 3/158 |
| 2019/0044367 | A1* | 2/2019 | Koike | H02J 7/14 |
| 2021/0152009 | A1* | 5/2021 | Hara | H02J 7/0018 |
| 2021/0234391 | A1* | 7/2021 | Kristjansson | H01M 10/44 |
| 2021/0245616 | A1* | 8/2021 | Konishi | B60L 55/00 |
| 2021/0359348 | A1* | 11/2021 | Zheng | B60L 58/27 |
| 2022/0416562 | A1* | 12/2022 | Ino | H02J 7/0013 |
| 2023/0050747 | A1* | 2/2023 | Hanaoka | H02J 13/00002 |

\* cited by examiner

| DISCHARGE CURRENT $I_L$ [A] | MAIN POWER SUPPLY POWER LOSS $P_{DM}$ [W] | CONVERSION EFFICIENCY $\eta$ | SUB-POWER SUPPLY POWER LOSS $P_{DS}$ [W] |
|---|---|---|---|
| 0 | 0 | 0.320 | 0 |
| 10 | 10 | 0.370 | 2331 |
| 20 | 40 | 0.418 | 4307 |
| 30 | 90 | 0.464 | 5950 |
| 40 | 160 | 0.508 | 7282 |
| 50 | 250 | 0.550 | 8325 |
| 60 | 360 | 0.590 | 9102 |
| 70 | 490 | 0.628 | 9635 |
| 80 | 640 | 0.664 | 9946 |
| 90 | 810 | 0.698 | 10057 |
| 100 | 1000 | 0.730 | 9990 |
| 110 | 1210 | 0.760 | 9768 |
| 120 | 1440 | 0.788 | 9413 |
| 130 | 1690 | 0.814 | 8947 |
| 140 | 1960 | 0.838 | 8392 |
| 150 | 2250 | 0.860 | 7770 |
| 160 | 2560 | 0.880 | 7104 |
| 170 | 2890 | 0.898 | 6416 |
| 180 | 3240 | 0.914 | 5728 |
| 190 | 3610 | 0.928 | 5062 |
| 200 | 4000 | 0.940 | 4440 |
| 210 | 4410 | 0.950 | 3885 |
| 220 | 4840 | 0.958 | 3419 |
| 230 | 5290 | 0.964 | 3064 |
| 240 | 5760 | 0.968 | 2842 |
| 250 | 6250 | 0.970 | 2775 |
| 260 | 6760 | 0.970 | 2886 |
| 270 | 7290 | 0.968 | 3197 |
| 280 | 7840 | 0.964 | 3730 |
| 290 | 8410 | 0.958 | 4507 |
| 300 | 9000 | 0.950 | 5550 |

| DISCHARGE CURRENT $i_L$ 100 [A] | | DISCHARGE CURRENT $i_L$ 150 [A] | | DISCHARGE CURRENT $i_L$ 200 [A] | | DISCHARGE CURRENT $i_L$ 250 [A] | | DISCHARGE CURRENT $i_L$ 300 [A] | |
|---|---|---|---|---|---|---|---|---|---|
| DISCHARGE CURRENT RATIO α | POWER LOSS TOTAL VALUE $P_D$ [W] | DISCHARGE CURRENT RATIO α | POWER LOSS TOTAL VALUE $P_D$ [W] | DISCHARGE CURRENT RATIO α | POWER LOSS TOTAL VALUE $P_D$ [W] | DISCHARGE CURRENT RATIO α | POWER LOSS TOTAL VALUE $P_D$ [W] | DISCHARGE CURRENT RATIO α | POWER LOSS TOTAL VALUE $P_D$ [W] |
| 1.00 | 1000 | 1.00 | 2250 | 1.00 | 4000 | 1.00 | 6250 | 1.00 | 9000 |
| 0.90 | 3141 | 0.93 | 4291 | 0.95 | 5941 | 0.96 | 8091 | 0.97 | 10741 |
| 0.80 | 4947 | 0.87 | 5897 | 0.90 | 7547 | 0.92 | 8597 | 0.93 | 12147 |
| 0.70 | 6440 | 0.80 | 7390 | 0.85 | 8840 | 0.88 | 10790 | 0.90 | 13240 |
| 0.60 | 7772 | 0.73 | 8492 | 0.80 | 9942 | 0.84 | 11692 | 0.87 | 14042 |
| 0.50 | 8575 | 0.67 | 8325 | 0.75 | 10575 | 0.80 | 12325 | 0.83 | 14575 |
| 0.40 | 9262 | 0.60 | 9012 | 0.70 | 11062 | 0.76 | 12712 | 0.80 | 14862 |
| 0.30 | 9725 | 0.53 | 10275 | 0.65 | 11325 | 0.72 | 12875 | 0.77 | 14925 |
| 0.20 | 9980 | 0.47 | 10436 | 0.60 | 11386 | 0.68 | 12836 | 0.73 | 14786 |
| 0.10 | 10067 | 0.40 | 10417 | 0.55 | 11267 | 0.64 | 12617 | 0.70 | 14467 |
| 0.00 | 9990 | 0.33 | 10240 | 0.50 | 10990 | 0.60 | 12240 | 0.67 | 13990 |
|  |  | 0.27 | 9928 | 0.45 | 10578 | 0.56 | 11728 | 0.63 | 13378 |
|  |  | 0.20 | 9603 | 0.40 | 10053 | 0.52 | 11103 | 0.60 | 12653 |
|  |  | 0.13 | 8987 | 0.35 | 9437 | 0.48 | 10387 | 0.57 | 11837 |
|  |  | 0.07 | 8422 | 0.30 | 8752 | 0.44 | 9602 | 0.53 | 10852 |
|  |  | 0.00 | 7770 | 0.25 | 8020 | 0.40 | 8770 | 0.50 | 10020 |
|  |  |  |  | 0.20 | 7284 | 0.36 | 7914 | 0.47 | 9064 |
|  |  |  |  | 0.15 | 6506 | 0.32 | 7056 | 0.43 | 8106 |
|  |  |  |  | 0.10 | 5768 | 0.28 | 6219 | 0.40 | 7168 |
|  |  |  |  | 0.05 | 5072 | 0.24 | 5422 | 0.37 | 6272 |
|  |  |  |  | 0.00 | 4440 | 0.20 | 4890 | 0.33 | 5440 |
|  |  |  |  |  |  | 0.16 | 4045 | 0.30 | 4695 |
|  |  |  |  |  |  | 0.12 | 3509 | 0.27 | 4059 |
|  |  |  |  |  |  | 0.08 | 3104 | 0.23 | 3554 |
|  |  |  |  |  |  | 0.04 | 2852 | 0.20 | 3202 |
|  |  |  |  |  |  | 0.00 | 2773 | 0.17 | 3025 |
|  |  |  |  |  |  |  |  | 0.13 | 3046 |
|  |  |  |  |  |  |  |  | 0.10 | 3287 |
|  |  |  |  |  |  |  |  | 0.07 | 3770 |
|  |  |  |  |  |  |  |  | 0.03 | 4517 |
|  |  |  |  |  |  |  |  | 0.00 | 5550 |

POWER SUPPLY CONTROL DEVICE, POWER SUPPLY DEVICE, AND POWER SUPPLY CONTROL METHOD

CROSS-REFERENCE TO RELATED APPLICATIONS

This application is based on and claims priority under 35 USC 119 from Japanese Patent Application No. 2021-133412 filed on Aug. 18, 2021, the contents of which are incorporated herein by reference.

TECHNICAL FIELD

The present disclosure relates to a power supply control device, a power supply device, and a power supply control method.

BACKGROUND ART

There is known a power supply device including a battery in which a large current load such as a starter motor through which a large current flows and a generator are connected in parallel, a capacitor that stores regenerative electric power generated by the generator, and a DC/DC converter that converts the regenerative electric power into a voltage corresponding to the capacitor and converts an output of the capacitor into a voltage corresponding to the load (for example, see JP-A-2016-77124).

When an internal resistance of a secondary battery changes depending on a state of charge, a deterioration state, a battery temperature, and the like, a power loss corresponding to the internal resistance occurs during charging and discharging of the secondary battery. In contrast, since an internal resistance of the capacitor is low, a power loss during charging and discharging of the capacitor is suppressed. However, the DC/DC converter that matches an inter-terminal voltage of the capacitor with a voltage of a system (a voltage of a main power supply such as the battery) is required since the inter-terminal voltage of the capacitor greatly changes depending on a state of charge of the capacitor. A conversion loss of the DC/DC converter cancels out an effect of suppressing the power loss due to the capacitor, and an efficiency during charging and discharging may be deteriorated in the entire system. Deterioration of the efficiency during charging and discharging in the entire system causes an increase in an amount of generated heat, which leads to necessity of a stronger cooling mechanism for suppressing a temperature rise of the system.

SUMMARY OF INVENTION

In view of the above circumstances, an object of the present disclosure is to provide a power supply control device, a power supply device, and a power supply control method capable of implementing highly efficient charging and discharging of a secondary battery.

According to an aspect of the present disclosure, there is provided a power supply control device configured to control charging and discharging of a power supply device including a plurality of power supply units which are connected in parallel to a load and a power generation unit. The power supply control device has relationship information indicating a relationship among a discharge current flowing from the power supply device to the load, a discharge current ratio that is a ratio of output currents of the plurality of power supply units, and a power loss of the power supply device, acquires a measured value of the discharge current flowing from the power supply device to the load, obtains, from the relationship information, the discharge current ratio at which the power loss of the power supply device corresponding to the acquired measured value of the discharge current flowing from the power supply device to the load is minimized, and adjusts a discharge current ratio set to the power supply control device so as to match with the discharge current ratio obtained from the relationship information.

According to an aspect of the present disclosure, there is provided a power supply control device configured to control charging and discharging of a power supply device including a plurality of power supply units which are connected in parallel to a load and a power generation unit. The power supply control device has relationship information indicating a relationship among a charge current flowing from the power generation unit to the power supply device, a charge current ratio that is a ratio of input currents of the plurality of power supply units, and a power loss of the power supply device, acquires a measured value of the charge current flowing from the power generation unit to the power supply device, obtains, from the relationship information, the charge current ratio at which the power loss of the power supply device corresponding to the acquired measured value of the charge current flowing from the power generation unit to the power supply device is minimized, and adjusts a charge current ratio set to the power supply control device so as to match with the charge current ratio obtained from the relationship information.

According to an aspect of the present disclosure, there is provided a power supply device that includes: a plurality of power supply units connected in parallel to a load and a power generation unit; and the above-described power supply control device configured to control charging and discharging of the plurality of power supply units.

According to an aspect of the present disclosure, there is provided a power supply control method for controlling, using a computer, charging and discharging of a power supply device including a plurality of power supply units connected in parallel to a load and a power generation unit. The power supply control method includes: providing relationship information indicating a relationship among a discharge current flowing from the power supply device to the load, a discharge current ratio that is a ratio of output currents of the plurality of power supply units, and a power loss of the power supply device, acquiring a measured value of the discharge current flowing from the power supply device to the load, obtaining, from the relationship information, the discharge current ratio at which the power loss of the power supply device corresponding to the acquired measured value of the discharge current flowing from the power supply device to the load is minimized, and adjusting a discharge current ratio set to the power supply control device so as to match with the discharge current ratio obtained from the relationship information.

According to an aspect of the present disclosure, there is provided a power supply control method for controlling, using a computer, charging and discharging of a power supply device including a plurality of power supply units connected in parallel to a load and a power generation unit. The power supply control method includes: providing relationship information indicating a relationship among a charge current flowing from the power generation unit to the power supply device, a charge current ratio that is a ratio of input currents of the plurality of power supply units, and a power loss of the power supply device, acquiring a measured value of the charge current flowing from the power generation unit to the power supply device, obtaining, from the relationship information, the charge current ratio at which the power loss of the power supply device corresponding to the acquired measured value of the charge current flowing from the power generation unit to the power supply device is minimized, and adjusting a charge current ratio set to the power supply control device so as to match with the charge current ratio obtained from the relationship information.

According to the present disclosure, the power loss of the power supply device including the plurality of power supply units can be minimized by setting the charge current ratio or the discharge current ratio of the plurality of power supply units, and therefore, highly efficient charging or discharging of a secondary battery can be implemented.

BRIEF DESCRIPTION OF DRAWINGS

FIG. 6 is a table showing a relationship among a discharge current and a discharge current ratio of the power supply device, and a total value of a power loss of the power supply device when the discharge current flowing from the power supply device to a load is shared by the main power supply unit and the sub-power supply unit.

DESCRIPTION OF EMBODIMENT

Hereinafter, the present disclosure will be described with reference to a preferred embodiment. The present disclosure is not limited to the embodiment to be described below, and the embodiment to be described below can be appropriately modified without departing from the scope of the present disclosure. Although some configurations are not illustrated or described in the embodiment to be described below, a known or well-known technique is appropriately applied to details of an omitted technique within a range in which no contradiction occurs to contents to be described below.

Figure 1:
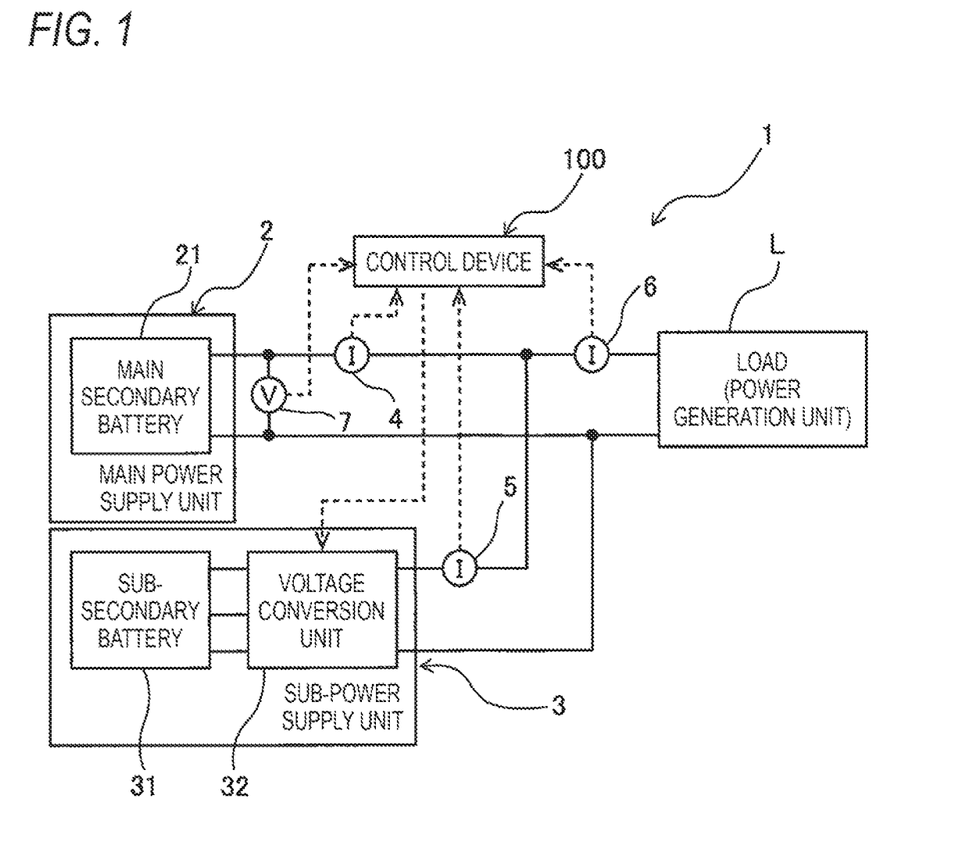
FIG. 1 is a diagram schematically showing a power supply device including a control device according to an embodiment of the present disclosure.

FIG. 1 is a diagram showing a power supply device 1 including a control device 100 according to an embodiment of the present disclosure. As shown in FIG. 1, the power supply device 1 includes a main power supply unit 2, a sub-power supply unit 3, current sensors 4. S. 6, a voltage sensor 7, and the control device 100. The main power supply unit 2 and the sub-power supply unit 3 are connected in parallel to a load (power generation unit) L.

The main power supply unit 2 includes a main secondary battery 21. The main secondary battery 21 is a secondary battery having a high energy density, such as a lithium ion battery. The sub-power supply unit 3 includes a sub-secondary battery 31 and a voltage conversion unit 32. The sub-secondary battery 31 is a secondary battery such as a lithium ion capacitor or a lithium titanium oxide ion secondary battery having an output density relatively higher and an internal resistance relatively lower than those of the main secondary battery 21. The voltage conversion unit 32 is a DC/DC converter or the like that matches a voltage of the power supply device 1 (a voltage of the main secondary battery 21) with a voltage of the sub-secondary battery 31. The sub-secondary battery 31 and the voltage conversion unit 32 are connected in series.

The current sensor 4 measures an input/output current of the main power supply unit 2 and transmits a measured value of the input/output current of the main power supply unit 2 to the control device 10. The current sensor 5 measures an input/output current of the sub-power supply unit 3 and transmits a measured value of the input/output current of the sub-power supply unit 3 to the control device 100. The current sensor 6 measures a charge/discharge current between the power supply device 1 and the load (power generation unit) L. and transmits a measured value of the charge/discharge current to the control device 100. Any one of the current sensors 4, 5, 6 (for example, the current sensor 6) may be omitted, and the current to be measured by the omitted current sensor may be calculated based on measurement values measured by the remaining two current sensors.

The voltage sensor 7 measures an inter-terminal voltage of the main secondary battery 21 and transmits a measured value of the inter-terminal voltage of the main secondary battery 21 to the control device 100. The control device 100 estimates battery states of the main power supply unit 2 and the sub-power supply unit 3 based on measurement values transmitted from the current sensors 4, 5, 6 and the voltage sensor 7. Examples of indexes indicating the battery states of the main power supply unit 2 and the sub-power supply unit 3 include an internal resistance and a power supply voltage of the main secondary battery 21, a conversion efficiency of the voltage conversion unit 32, and the like.

The power supply device 1 is an in-vehicle power supply or a stationary power supply. The main secondary battery 21 and the sub-secondary battery 31 of the power supply device 1 are charged by being supplied with electric power from the power generation unit through a charging circuit (not shown), and discharge the charged electric power to supply the electric power to the load L. When the power supply device 1 is used in a vehicle, a driving motor, an air conditioner, various in-vehicle electrical components, and the like serve as the load L. The driving motor serves as both the load L and the power generation unit. When the power supply device 1 is the stationary power supply, domestic appliances at home, a commercial power supply system, a liquid crystal display, a communication module, and the like serve as the load L, and a solar power generation system and the like serve as the power generation unit.

Figure 2:
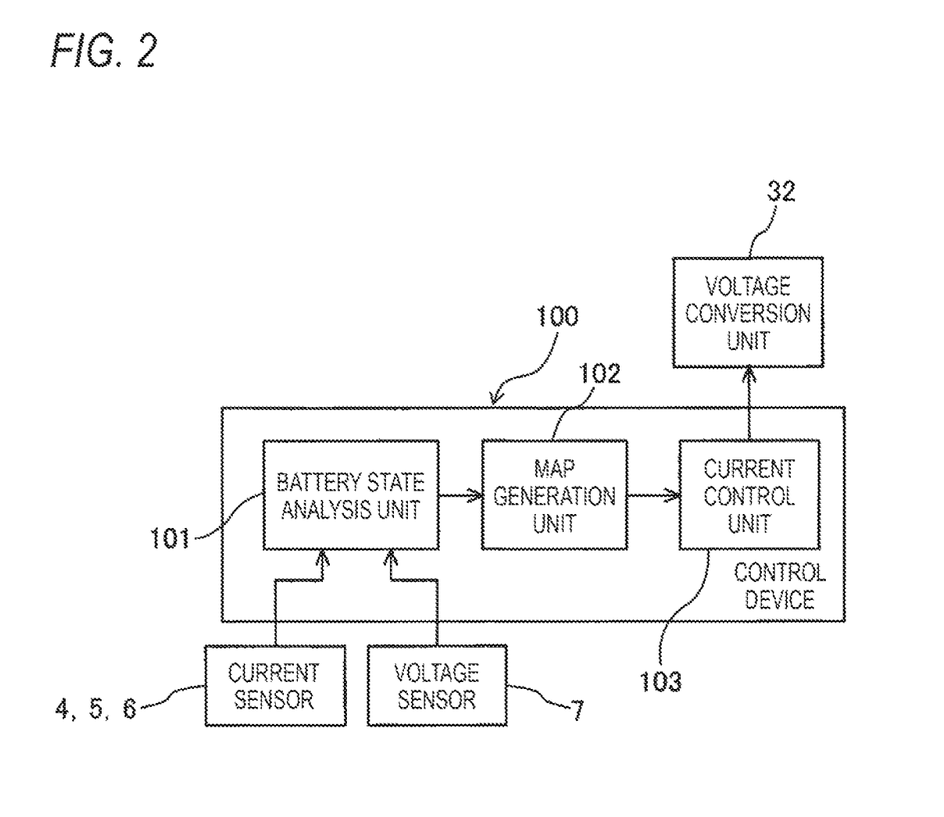
FIG. 2 is a block diagram showing functions of the control device shown in FIG. 1.

FIG. 2 is a block diagram showing functions of the control device 100 shown in FIG. 1. As shown in this drawing, the control device 100 includes a battery state analysis unit 101, a map generation unit 102, and a current control unit 103.

The battery state analysis unit 101 estimates the battery states of the main power supply unit 2 and the sub-power supply unit 3 based on the measured value of the input/output current of the main power supply unit 2 transmitted from the current sensor 4, the measured value of the input/output current of the sub-power supply unit 3 transmitted from the current sensor 5, the measured value of the charge/discharge current between the power supply device 1 and the load L transmitted from the current sensor 6, and the measured value of the inter-terminal voltage of the main secondary battery 21 transmitted from the voltage sensor 7. Specifically, the battery state analysis unit 101 estimates an internal resistance and a power supply voltage of the main secondary battery 21, a conversion loss of the voltage conversion unit 32, and the like based on the measured values of the current sensors 4, 5, 6 and the voltage sensor 7.

The map generation unit 102 has a discharge current ratio map and a charge current ratio map created in advance, and updates the discharge current ratio map and the charge current ratio map according to results of the internal resistance and the power supply voltage of the main secondary battery 21, and the conversion loss of the voltage conversion unit 32 estimated by the battery state analysis unit 101. The discharge current ratio map is information indicating a relationship among a discharge current flowing from the power supply device 1 to the load L, a total value of a power loss of the power supply device 1 during discharging, and a discharge current ratio that is a ratio of an output current of the main power supply unit 2 to an output current of the sub-power supply unit 3.

A total value $P_D$ of a power loss of the power supply device 1 during discharging is expressed by the following equation (1).

$$P_D = P_{DM} + P_{DS} \quad (1)$$

$P_{DM}$ is a power loss of the main power supply unit 2 during discharging, and $P_{DS}$ is a power loss of the sub-power supply unit 3 during discharging.

The power loss $P_{DM}$ of the main power supply unit 2 during discharging is expressed by the following equation (2), and the power loss $P_{DS}$ of the sub-power supply unit 3 at the time of discharge is expressed by the following equation (3).

$$P_{DM} = I_L^2 \times r_m \quad (2)$$

$I_L$ is a discharge current flowing from the power supply device 1 to the load L, and $r_m$ is an internal resistance of the main power supply unit 2.

$$P_{DS} = I_L \times V_m \times \eta \quad (3)$$

$V_m$ is a power supply voltage of the main secondary battery 21, and $\eta$ is a conversion efficiency of the voltage conversion unit (DC/DC converter) 32 of the sub-power supply unit 3 during discharging.

A total value $P_D'$ of a power loss of the power supply device 1 during charging is expressed by the following equation (4).

$$P_D' = P_{DM}' + P_{DS}' \quad (4)$$

$P_{DM}'$ is a power loss of the main power supply unit 2 during charging, and $P_{DS}'$ is a power loss of the sub-power supply unit 3 during charging.

The power loss $P_{DM}'$ of the main power supply unit 2 during charging is expressed by the following equation (5), and the power loss $P_{DS}'$ of the sub-power supply unit 3 during charging is expressed by the following equation (6).

$$P_{DM}' = I_L'^2 \times r_m \quad (5)$$

$I_L'$ is a charge current flowing from the load L to the power supply device 1.

$$P_{DS}' = I_L' \times V_m \times \eta' \quad (6)$$

$\eta'$ is a conversion efficiency of the voltage conversion unit (DC/DC converter) 32 when the sub-power supply unit 3 is charged.

When power losses $P_{DS}$, $P_{DS}'$ of the sub-power supply unit 3 are calculated, it is assumed that an internal resistance of the sub-secondary battery 31 is sufficiently low (for example, 0.001Ω), and a loss caused by the internal resistance of the sub-secondary battery 31 is not included in the calculation.

Figure 3:
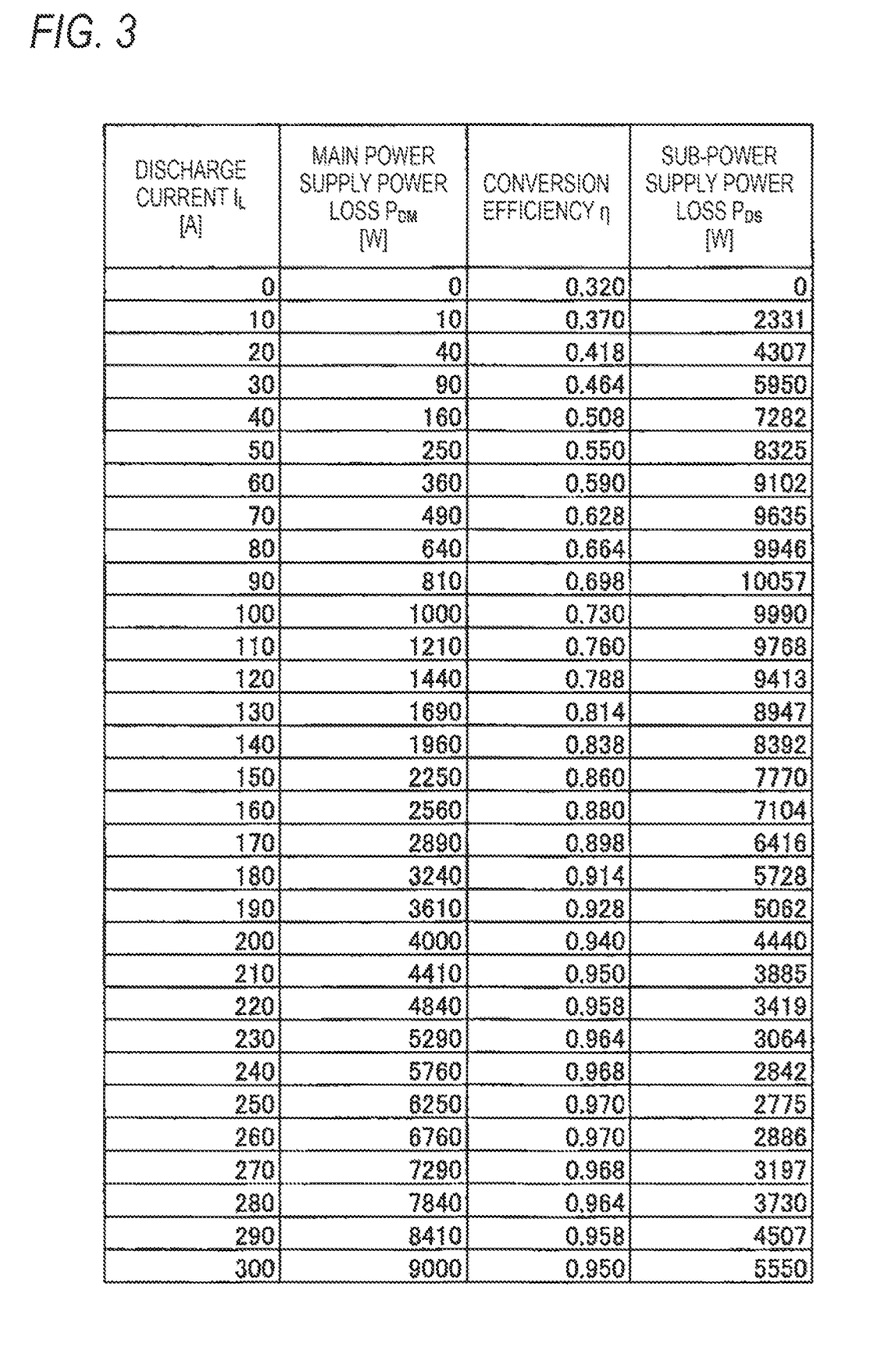
FIG. 3 is a table showing an example of a relationship among a discharge current of the power supply device, a power loss of a main power supply unit during discharging, a conversion efficiency of a voltage conversion unit during discharging, and a power loss of a sub-power supply unit during discharging.
Figure 4:
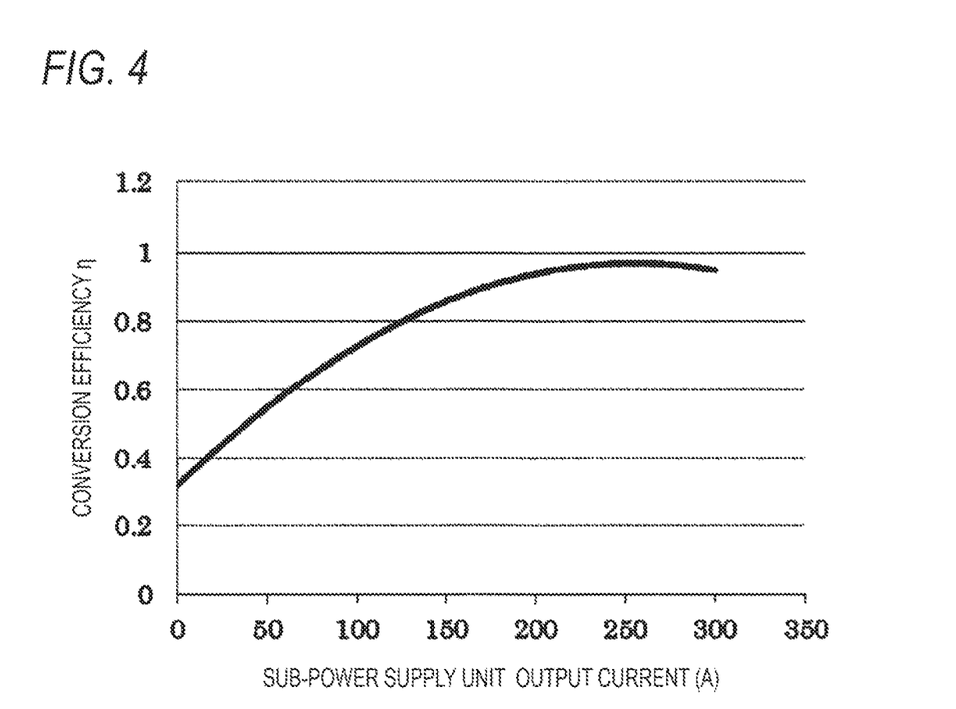
FIG. 4 is a graph showing an example of a relationship between an output current of the sub-power supply unit and a conversion efficiency of the voltage conversion unit during discharging.
Figure 5:
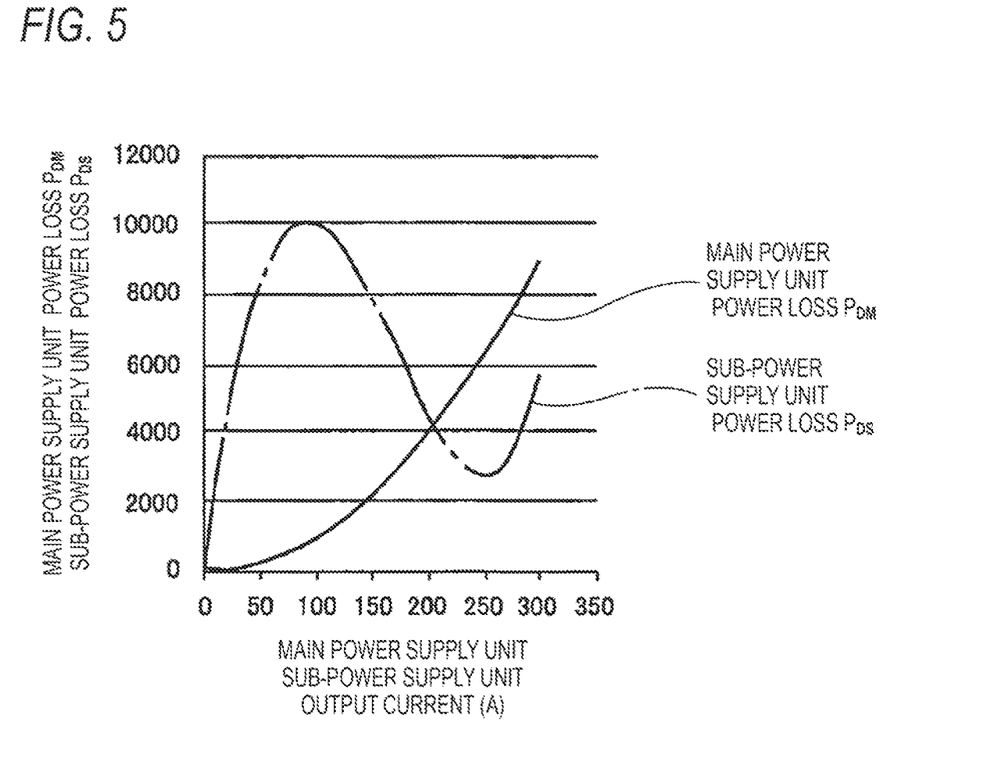
FIG. 5 is a graph showing an example of a relationship between an output current of the main power supply unit and a power loss of the main power supply unit during discharging, and a relationship between an output current of the sub-power supply unit and a power loss of the sub-power supply unit during discharging.

FIG. 3 is a table showing an example or a relationship among the discharge current $I_L$ of the power supply device 1, the power loss $P_{DM}$ of the main power supply unit 2 during discharging, the conversion efficiency $\eta$ of the voltage conversion unit 32 during discharging, and the power loss $P_{DS}$ of the sub-power supply unit 3 during discharging. FIG. 4 is a graph showing an example of a relationship between an output current of the sub-power supply unit 3 and the conversion efficiency $\eta$ of the voltage conversion unit 32 during discharging. FIG. 5 is a graph showing an example of a relationship between an output current of the main power supply unit 2 and the power loss $P_{DM}$ of the main power supply unit 2 during discharging, and a relationship between an output current of the sub-power supply unit 3 and the power loss $P_{DS}$ of the sub-power supply unit 3 during discharging. In the present example, it is assumed that an inter-terminal voltage of the main secondary battery 21 is 370 V, an internal resistance of the main secondary battery 21 is 0.1Ω, and an internal resistance of the sub-secondary battery 31 is 0.001Ω.

As shown in the table of FIG. 3 and the graph of FIG. 5, the power loss $P_{DM}$ of the main power supply unit 2 gradually increases as the output current of the main power supply unit 2 increases. In contrast, the power loss $P_{DS}$ of the sub-power supply unit 3 irregularly increases or decreases as the output current of the sub-power supply unit 3 increases.

Figure 7:
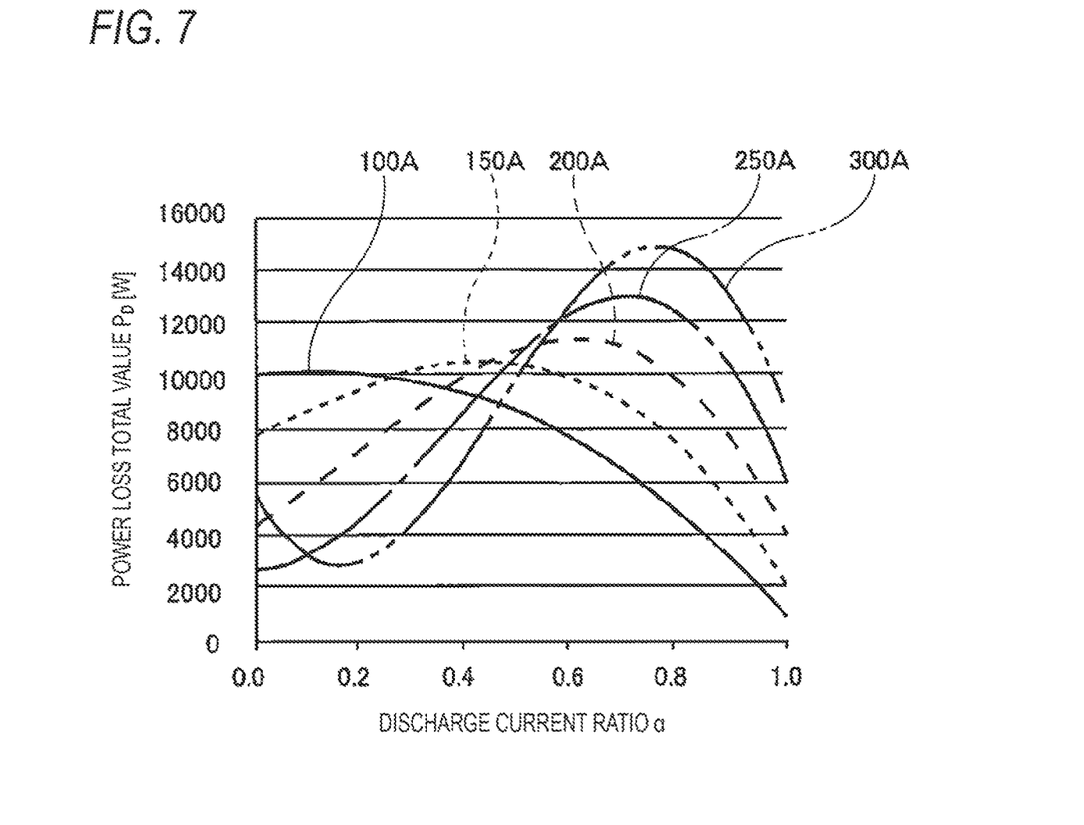
FIG. 7 is a graph showing the relationship among the discharge current and the discharge current ratio of the power supply device, and the total value of the power loss of the power supply device when the discharge current flowing from the power supply device to the load is shared by the main power supply unit and the sub-power supply unit.

FIG. 6 is a table showing a relationship among the discharge current $I_L$ and a discharge current ratio α of the power supply device 1, and the total value $P_D$ of a power loss of the power supply device 1 when the discharge current $I_L$ from the power supply device 1 to the load L is shared by the main power supply unit 2 and the sub-secondary battery 31. FIG. 7 is a graph showing the relationship among the discharge current $I_L$ and the discharge current ratio α of the power supply device 1, and the total value $P_D$ of the power loss of the power supply device 1 when the discharge current $I_L$ from the power supply device 1 to the load L is shared by the main power supply unit 2 and the sub-secondary battery 31.

The discharge current ratio α satisfies α=1.0 when a ratio of an output current of the main power supply unit 2 to an output current of the sub-power supply unit 3 is 1:0, and the discharge current ratio α satisfies α=0 when the ratio of the output current of the main power supply unit 2 to the output current of the sub-power supply unit 3 is 0:1. The discharge current ratio α satisfies α=0.5 when the ratio of the output current of the main power supply unit 2 to the output current of the sub-power supply unit 3 is 1:1.

As shown in FIG. 7, a profile of the graph having the total value $P_D$ of the power loss of the power supply device 1 as a vertical axis and the discharge current ratio α as a horizontal axis varies depending on the discharge current $I_L$ of the power supply device 1. For example, when the discharge current $I_L$ of the power supply device 1 is 100 A, the total value $P_D$ of the power loss of the power supply device 1 gradually decreases as the discharge current ratio α increases. In this case, the total value $P_D$ of the power loss of the power supply device 1 can be minimized by setting the discharge current ratio α to 1.0. In contrast, when the discharge current $I_1$ of the power supply device 1 is 150 A, 200 A, 250 A, or 300 A, the total value $P_D$ of the power loss of the power supply device 1 irregularly increases or decreases as the discharge current ratio α increases. When the discharge current $I_L$ of the power supply device 1 is 150 A or 200 A, the total value $P_D$ of the power loss of the power supply device 1 can be minimized by setting the discharge current ratio α to 1.0. When the discharge current $I_L$ of the power supply device 1 is 250 A, the total value $P_D$ of the power loss of the power supply device 1 can be minimized by setting the discharge current ratio α to 0. When the discharge current IT of the power supply device 1 is 300 A, the total value $P_D$ of the power loss of the power supply device 1 can be minimized by setting the discharge current ratio α to 0.15. That is, in order to minimize the total value $P_D$ of the power loss of the power supply device 1 during discharging, it is necessary to set the discharge current ratio α according to the discharge current $I_L$ of the power supply device 1.

Although detailed description of an example is omitted, the power loss $P_{DM}'$ of the main power supply unit 2 during charging gradually increases as a charge current of the main power supply unit 2 increases. In contrast, the power loss $P_{DS}'$ of the sub-power supply unit 3 during charging irregularly increases or decreases as a charge current of the sub-power supply unit 3 increases. Therefore, a charge current ratio α' that minimizes the total value $P_D'$ of the power loss of the power supply device 1 during charging varies depending on the charge current $I_L'$ of the power supply device 1. Although not shown, a profile of a graph having the total value $P_D'$ of the power loss of the power supply device 1 during charging as a vertical axis and the charge current ratio α' as a horizontal axis varies depending on the charge current $I_L'$ of the power supply device 1. Therefore, in order to minimize the total value $P_D'$ of the power loss of the power supply device 1 during charging, it is necessary to set the charge current ratio α' according to the charge current $I_L'$ of the power supply device 1.

Therefore, in order to minimize the total value $P_D$ of the power loss of the power supply device 1 during discharging, the current control unit 103 shown in FIG. 2 sets the discharge current ratio α by adjusting an output current of the voltage conversion unit 32 according to the discharge current $I_L$ of the power supply device 1. In order to minimize the total value $P_D'$ of the power loss of the power supply device 1 during charging, the current control unit 103 sets the charge current ratio α' by adjusting an input current of the voltage conversion unit 32 according to the charge current $I_L'$ of the power supply device 1.

The charge current ratio α' satisfies α'=1.0 when a ratio of an input current of the main power supply unit 2 to an input current of the sub-power supply unit 3 is 1:0, and satisfies α'=0.1 when the ratio of the input current of the main power supply unit 2 to the input current of the sub-power supply unit 3 is 0:1. The charge current ratio α' satisfies α'=0.5 when the ratio of the input current of the main power supply unit 2 to the input current of the sub-power supply unit 3 is 1:1.

Figure 8:
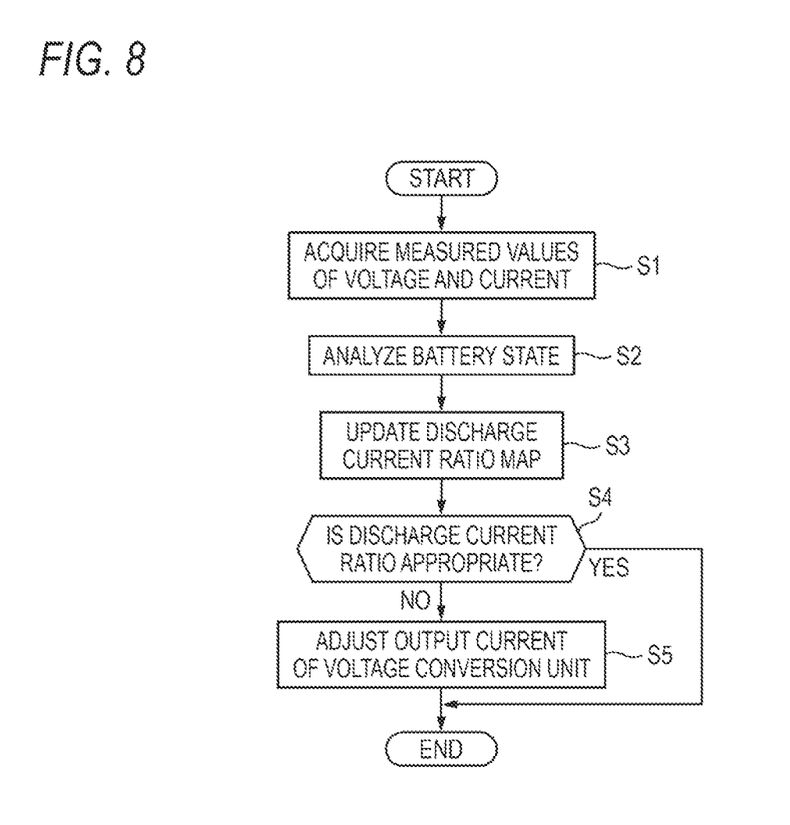
FIG. 8 is a flowchart showing charging control by the control device shown in FIGS. 1 and 2.

FIG. 8 is a flowchart showing discharging control by the control device 100. Processing shown in this flowchart is started when the power supply device 1 is set to a discharge mode, and the processing proceeds to step S1.

In step S1, the battery state analysis unit 101 acquires a measured value of an output current of the main power supply unit 2 transmitted from the current sensor 4, a measured value of an output current of the sub-power supply unit 3 transmitted from the current sensor 5, a measured value of the discharge current $I_L$ from the power supply device 1 to the load L transmitted from the current sensor 6, and a measured value of an inter-terminal voltage of the main power supply unit 2 transmitted from the voltage sensor 7.

Next, in step S2, the battery state analysis unit 101 estimates the internal resistance $r_m$ and the power supply voltage $V_m$ of the main secondary battery 21 and the conversion efficiency q of the voltage conversion unit 32 based on measured values of currents and the voltage acquired in step S1.

Next, in step S3, the map generation unit 102 updates a discharge current ratio map according to results of the internal resistance $r_m$ and the power supply voltage $V_m$ of the main secondary battery 21 and the conversion efficiency n of the voltage conversion unit 32 estimated by the battery state analysis unit 101 in step S2.

Next, in step S4, the current control unit 103 determines whether the currently set discharge current ratio α is appropriate. Specifically, the current control unit 103 obtains a minimum value of the total value $P_D$ of a power loss of the power supply device 1 corresponding to the discharge current $I_L$ measured by the current sensor 6, and the discharge current ratio α corresponding to the minimum value of the total value $P_D$ of the power loss of the power supply device 1, from the discharge current ratio map updated in step S3. Then, the current control unit 103 compares the discharge current ratio α obtained from the discharge current ratio map with the currently set discharge current ratio α, and determines whether a difference therebetween is within a predetermined range. When an affirmative determination is made in step S4, the processing ends, and when a negative determination is made in step S4, the processing proceeds to step S5. In step S4, instead of determining whether the difference between the discharge current ratio α obtained from the discharge current ratio map and the currently set discharge current ratio α is within the predetermined range, it may be determined whether both coincide with each other.

In step S5, the current control unit 103 adjusts an output current of the voltage conversion unit 32 such as a DC/DC converter such that the currently set discharge current ratio α coincides with the discharge current ratio α obtained in step S4. The processing ends as described above.

Figure 9:
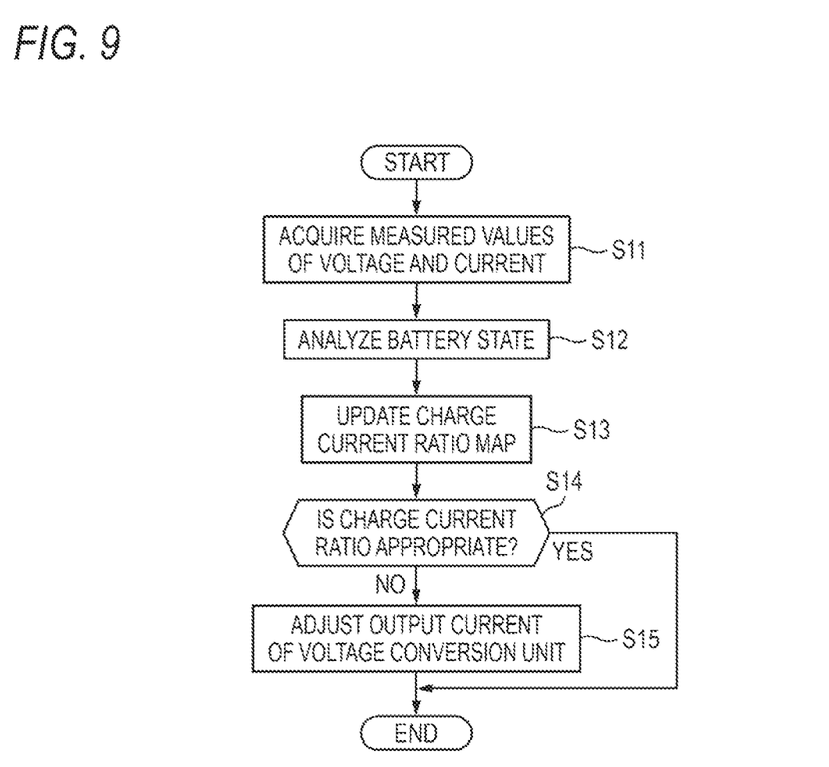
FIG. 9 is a flowchart showing discharging control by the control device shown in FIGS. 1 and 2.

FIG. 9 is a flowchart showing charging control by the control device 100. Processing shown in this flowchart is started when the power supply device 1 is set to a charge mode, and the processing proceeds to step S11.

In step S11, the battery state analysis unit 101 acquires a measured value of an input current of the main power supply unit 2 transmitted from the current sensor 4, a measured value of an input current of the sub-power supply unit 3 transmitted from the current sensor 5, a measured value of the charge current $I_L'$ from the load L to the power supply device 1 transmitted from the current sensor 6, and a measured value of an inter-terminal voltage of the main secondary battery 21 transmitted from the voltage sensor 7.

Next, in step S12, the battery state analysis unit 101 estimates the internal resistance $r_m$ and the power supply voltage $V_m$ of the main secondary battery 21, and the conversion efficiency η' of the voltage conversion unit 32 based on measured values of currents and the voltage acquired in step S11.

Next, in step S13, the map generation unit 102 updates a charge current ratio map according to results of the internal resistance $r_m$ and the power supply voltage $V_m$ of the main secondary battery 21, and the conversion efficiency η' of the voltage conversion unit 32 estimated by the battery state analysis unit 101 in step S12.

Next, in step S14, the current control unit 103 determines whether the currently set charge current ratio α' is appropriate. Specifically, the current control unit 103 obtains a minimum value of the total value $P_D'$ of a power loss of the power supply device 1 corresponding to the charge current $I_L'$ measured by the current sensor 6, and the charge current ratio α' corresponding to the minimum value of the total value $P_D'$ of the power loss of the power supply device 1, from the charge current ratio map updated in step S13. Then, the current control unit 103 compares the charge current ratio α' obtained from the charge current ratio map with the currently set charge current ratio α', and determines whether a difference therebetween is within a predetermined range. When an affirmative determination is made in step S14, the processing ends, and when a negative determination is made in step S14, the processing proceeds to step S15. In step S14, instead of determining whether the difference between the charge current ratio α' obtained from the charge current ratio map and the currently set charge current ratio α' is within the predetermined range, it may be determined whether both coincide with each other.

In step S15, the current control unit 103 adjusts an input current of the voltage conversion unit 32 such as a DC/DC converter such that the currently set charge current ratio α' coincides with the charge current ratio α' obtained in step S14. The processing ends as described above.

As described above, the control device 100 according to the present embodiment has the discharge current ratio map indicating a relationship among the discharge current $I_L$ from the power supply device 1 to the load L, the discharge current ratio α that is a ratio of the output current of the main power supply unit 2 to the output current of the sub-power supply unit 3, and the total value PT of the power loss of the power supply device 1 during discharging. The control device 100 acquires the measured value of the discharge current $I_L$ from the power supply device 1 to the load L, obtains the discharge current ratio α corresponding to the acquired measured value of the discharge current $I_L$ and the minimum value of the total value $P_D$ of the power loss of the power supply device 1 during discharging from the discharge current ratio map, and adjusts the output current output from the voltage conversion unit 32 to the load L such that the obtained discharge current ratio α is achieved. Accordingly, it is possible to minimize the power loss of the power supply device 1 during discharging, the power supply device 1 including the main power supply unit 2 and the sub-power supply unit 3. Since the power loss of the power supply device 1 can be suppressed and an efficiency during discharging can be improved, an increase in an amount of heat generated by the power supply device 1 can be suppressed, and thus a stronger cooling mechanism for suppressing a temperature rise of the power supply device 1 can be made unnecessary.

The control device 100 according to the present embodiment estimates battery states of the main power supply unit 2 and the sub-power supply unit 3 (the internal resistance $r_m$ and the power supply voltage $V_m$ of the main secondary battery 21, the conversion efficiency η of the voltage conversion unit 32, and the like) based on the measured values of the currents acquired from the current sensors 4, 5, 6, the measured value of the inter-terminal voltage of the main secondary battery 21 acquired from the voltage sensor 7, and the like. Then, the control device 100 updates the discharge current ratio map according to the estimated battery states of the main power supply unit 2 and the sub-power supply unit 3. Accordingly, an optimum condition of the discharge current ratio α can be obtained for each combination of conditions such as a state of charge (SOC), a battery temperature, and a current value of the main secondary battery 21 or the sub-secondary battery 31, and discharging control with a low loss can always be implemented.

In addition, the control device 100 according to the present embodiment has the charge current ratio map indicating a relationship among the charge current $I_L'$ from the load (power generation unit) L to the power supply device 1, the charge current ratio α' that is a ratio of the input current of the main power supply unit 2 to the input current of the sub-power supply unit 3, and the total value $P_D'$ of the power loss of the power supply device 1 during charging. The control device 100 acquires the measured value of the charge current $I_L'$ from the load (power generation unit) L to the power supply device 1, obtains the charge current ratio α' corresponding to the acquired measured value of the charge current $I_L'$ and the minimum value of the total value $P_D'$ of the power loss of the power supply device 1 during charging from the charge current ratio map, and adjusts the input current input from the load (power generation unit) L to the voltage conversion unit 32 such that the obtained charge current ratio α' is achieved. Accordingly, it is possible to minimize the power loss of the power supply device 1 during charging, the power supply device 1 including the main power supply unit 2 and the sub-power supply unit 3. Since the power loss of the power supply device 1 can be suppressed and an efficiency during charging can be improved, an increase in an amount of heat generated by the power supply device 1 can be suppressed, and thus a stronger cooling mechanism for suppressing a temperature rise of the power supply device 1 can be made unnecessary.

The control device 100 according to the present embodiment estimates battery states of the main power supply unit 2 and the sub-power supply unit 3 (the internal resistance $r_m$ and the power supply voltage $V_m$ of the main secondary battery 21, the conversion efficiency η' of the voltage conversion unit 32, and the like) based on the measured values of the currents acquired from the current sensors 4, 5, 6, the measured value of the inter-terminal voltage of the main secondary battery 21 acquired from the voltage sensor 7, and the like. Then, the control device 100 updates the charge current ratio map according to the estimated battery states of the main power supply unit 2 and the sub-power supply unit 3. Accordingly, an optimum condition of the charge current ratio α' can be obtained for each combination of conditions such as a SOC, a battery temperature, and a current value of the main secondary battery 21 and the sub-secondary battery 31, and charging control with a low loss can always be implemented.

Although the present disclosure has been described above based on the embodiment, the present disclosure is not limited to the above embodiment, and the above embodiment may be modified, or known or well-known technologies may be appropriately combined, without departing from the scope of the present disclosure.

For example, in the above embodiment, the discharge current ratio α is set by adjusting the output current of the sub-power supply unit 3 by the voltage conversion unit 32 such as a DC/DC converter, but may be set by adjusting the output current of the sub-power supply unit 3 by another current adjustment mechanism. In the above embodiment, the charge current ratio α' is set by adjusting the input current of the sub-power supply unit 3 by the voltage conversion unit 32 such as a DC/DC converter, but may be set by adjusting the input current of the sub-power supply unit 3 by another current adjustment mechanism.

A method of calculating each of the total values $P_D$, $P_D'$ of the power loss of the power supply device 1 is not limited to a method according to the above embodiment, and may be appropriately selected according to a circuit configuration of the power supply device 1. In the above embodiment, the battery state (the internal resistance $r_m$ and the power supply voltage $V_m$) of the main secondary battery 21 and the conversion efficiency η of the voltage conversion unit 32 are estimated in battery state analysis processing, but the battery state (the internal resistance, the power supply voltage, and the like) of the sub-secondary battery 31 may be estimated.

In the above embodiment, the present disclosure has been described by exemplifying the power supply device 1 including the main power supply unit 2 and the sub-power supply unit 3, but the present disclosure can also be applied to a power supply device including three or more power supply units. In this case, relationship information indicating a relationship among a discharge current, discharge current ratios of the three or more power supply units, and a power supply loss of the power supply device may be provided in advance, the discharge current ratios of the three or more power supply units at which the power loss of the power supply device corresponding to an acquired measured value of the discharge current is minimized may be obtained from the relationship information, and the discharge current ratios of the three or more power supply units may be adjusted to be the discharge current ratios obtained from the relationship information. In addition, relationship information indicating a relationship among a charge current, charge current ratios of the three or more power supply units, and a power supply loss of the power supply device may be provided in advance, the charge current ratios of the three or more power supply units at which the power loss of the power supply device corresponding to an acquired measured value of the charge current is minimized may be obtained from the relationship information, and the charge current ratios of the three or more power supply units may be adjusted to be the charge current ratios obtained from the relationship information.

Here, characteristics of the embodiment of the power supply control device, the power supply device, and the power supply control method according to the present disclosure described above are summarized briefly in the following [1] to [8].

[1] A power supply control device (100) configured to control charging and discharging of a power supply device (1) including a plurality of power supply units (2, 3) which are connected in parallel to a load (L) and a power generation unit (L), in which the power supply control device (100)

has relationship information indicating a relationship among a discharge current ($I_L$) flowing from the power supply device (1) to the load (L), a discharge current ratio that is a ratio of output currents of the plurality of power supply units (2, 3), and a power loss (P)) of the power supply device (1), acquires a measured value of the discharge current ($I_L$) flowing from the power supply device (1) to the load (L).

obtains, from the relationship information, the discharge current ratio (α) at which the power loss ($P_D$) of the power supply device (1) corresponding to the acquired measured value of the discharge current ($I_L$) flowing from the power supply device (1) to the load (L) is minimized, and adjusts a discharge current ratio (a) set to the power supply control device (100) so as to match with the discharge current ratio (a) obtained from the relationship information.

[2] The power supply control device (100) according to above [1], in which the power supply control device (1)

estimates a battery state of at least one of secondary batteries (21, 31) included in the plurality of power supply units (2, 3), and updates the relationship information according to the estimated battery state.

[3] A power supply control device (100) configured to control charging and discharging of a power supply device (1) including a plurality of power supply units (2, 3) which are connected in parallel to a load (L) and a power generation unit (L), in which the power supply control device (100)

has relationship information indicating a relationship among a charge current ($I_L'$) flowing from the power generation unit (L) to the power supply device (1), a charge current ratio (α') that is a ratio of input currents of the plurality of power supply units (2, 3), and a power loss ($P_D'$) of the power supply device (1), acquires a measured value of the charge current ($I_L'$) flowing from the power generation unit (L) to the power supply device (1), obtains, from the relationship information, the charge current ratio (α') at which the power loss ($P_D'$) of the power supply device (1) corresponding to the acquired measured value of the charge current ($I_L'$) flowing from the power generation unit (L) to the power supply device (1) is minimized, and adjusts a charge current ratio (α') set to the power supply control device (100) so as to match with the charge current ratio (α) obtained from the relationship information.

[4] The power supply control device (100) according to above [3], in which the power supply control device (100)

estimates a battery state of at least one of secondary batteries (21, 31) included in the plurality of power supply units (2, 3), and updates the relationship information according to the estimated battery state.

[5] The power supply control device (100) according to any one of above [1] to [4], in which at least one of the plurality of power supply units (2, 3) includes a secondary battery (31) and a voltage conversion unit (32) configured to convert an input/output voltage of the secondary battery.

[6] A power supply device (1) including:
a plurality of power supply units (2, 3) connected in parallel to a load (L) and a power generation unit (L); and
the power supply control device (100), according to any one of above [1] to [4], configured to control charging and discharging of the plurality of power supply units (2, 3).

[7] A power supply control method for controlling, using a computer, charging and discharging of a power supply device (1) including a plurality of power supply units (2, 3) which are connected in parallel to a load (L) and a power generation unit (L), the power supply control method including:
providing relationship information indicating a relationship among a discharge current ($I_L$) flowing from the power supply device (1) to the load (L), a discharge current ratio ($\alpha'$) that is a ratio of output currents of the plurality of power supply units (2, 3), and a power loss ($P_D$) of the power supply device (1),
acquiring a measured value of the discharge current ($I_L$) flowing from the power supply device (1) to the load (L),
obtaining, from the relationship information, the discharge current ratio ($\alpha$) at which the power loss ($P_D$) of the power supply device (1) corresponding to the acquired measured value of the discharge current ($I_L$) flowing from the power supply device (1) to the load (L) is minimized, and
adjusting a discharge current ratio ($\alpha$) set to the power supply device (1) so as to match with the discharge current ratio ($\alpha$) obtained from the relationship information.

[8] A power supply control method for controlling, using a computer, charging and discharging of a power supply device (1) including a plurality of power supply units (2, 3) which are connected in parallel to a load (L) and a power generation unit (L), the power supply control method including:
providing relationship information indicating a relationship among a charge current ($I_L'$) flowing from the power generation unit (L) to the power supply device (1), a charge current ratio (a) that is a ratio of input currents of the plurality of power supply units (2, 3), and a power loss ($P_D'$) of the power supply device (1),
acquiring a measured value of the charge current ($I_L'$) flowing from the power generation unit (L) to the power supply device (1),
obtaining, from the relationship information, the charge current ratio (a) at which the power loss ($P_D'$) of the power supply device (1) corresponding to the acquired measured value of the charge current (I') flowing from the power generation unit (L) to the power supply device (1) is minimized, and
adjusting a charge current ratio ($\alpha'$) set to the power supply device (1) so as to match with the charge current ratio ($\alpha'$) obtained from the relationship information.

What is claimed is:

1. A power supply control device configured to control charging and discharging of a power supply device including a plurality of power supply units which are connected in parallel to a load and a power generation unit,
wherein the power supply control device
has relationship information indicating a relationship among a discharge current flowing from the power supply device to the load, a discharge current ratio that is a ratio of output currents of the plurality of power supply units, and a power loss of the power supply device,
acquires a measured value of the discharge current flowing from the power supply device to the load,
obtains, from the relationship information, the discharge current ratio at which the power loss of the power supply device corresponding to the acquired measured value of the discharge current flowing from the power supply device to the load is minimized,
adjusts a discharge current ratio set to the power supply control device so as to match with the discharge current ratio obtained from the relationship information, and
estimates a battery state of at least one of secondary batteries included in the plurality of power supply units, and
updates the relationship information according to the estimated battery state.

2. The power supply control device according to claim 1, wherein at least one of the plurality of power supply units includes a secondary battery and a voltage conversion unit configured to convert an input/output voltage of the secondary battery.

3. A power supply device comprising:
a plurality of power supply units connected in parallel to a load and a power generation unit; and
the power supply control device, according to claim 1, configured to control charging and discharging of the plurality of power supply units.

4. A power supply control device configured to control charging and discharging of a power supply device including a plurality of power supply units which are connected in parallel to a load and a power generation unit,
wherein the power supply control device
has relationship information indicating a relationship among a charge current flowing from the power generation unit to the power supply device, a charge current ratio that is a ratio of input currents of the plurality of power supply units, and a power loss of the power supply device,
acquires a measured value of the charge current flowing from the power generation unit to the power supply device,
obtains, from the relationship information, the charge current ratio at which the power loss of the power supply device corresponding to the acquired measured value of the charge current flowing from the power generation unit to the power supply device is minimized,
adjusts a charge current ratio set to the power supply control device so as to match with the charge current ratio obtained from the relationship information,
estimates a battery state of at least one of secondary batteries included in the plurality of power supply units, and
updates the relationship information according to the estimated battery state.

5. The power supply control device according to claim 4, wherein at least one of the plurality of power supply units includes a secondary battery and a voltage conversion unit configured to convert an input/output voltage of the secondary battery.

6. A power supply device comprising:
a plurality of power supply units connected in parallel to a load and a power generation unit; and the power supply control device, according to claim 4, configured to control charging and discharging of the plurality of power supply units.

7. A power supply control method for controlling, using a computer, charging and discharging of a power supply device including a plurality of power supply units which are connected in parallel to a load and a power generation unit, the power supply control method comprising:
- providing relationship information indicating a relationship among a discharge current flowing from the power supply device to the load, a discharge current ratio that is a ratio of output currents of the plurality of power supply units, and a power loss of the power supply device;
- acquiring a measured value of the discharge current flowing from the power supply device to the load;
- obtaining, from the relationship information, the discharge current ratio at which the power loss of the power supply device corresponding to the acquired measured value of the discharge current flowing from the power supply device to the load is minimized;
- adjusting a discharge current ratio set to the power supply device so as to match with the discharge current ratio obtained from the relationship information;
- estimates a battery state of at least one of secondary batteries included in the plurality of power supply units; and
- updates the relationship information according to the estimated battery state.

8. A power supply control method for controlling, using a computer, charging and discharging of a power supply device including a plurality of power supply units which are connected in parallel to a load and a power generation unit, the power supply control method comprising:
- providing relationship information indicating a relationship among a charge current flowing from the power generation unit to the power supply device, a charge current ratio that is a ratio of input currents of the plurality of power supply units, and a power loss of the power supply device;
- acquiring a measured value of the charge current flowing from the power generation unit to the power supply device;
- obtaining, from the relationship information, the charge current ratio at which the power loss of the power supply device corresponding to the acquired measured value of the charge current flowing from the power generation unit to the power supply device is minimized; and
- adjusting a charge current ratio set to the power supply device so as to match with the charge current ratio obtained from the relationship information;
- estimates a battery state of at least one of secondary batteries included in the plurality of power supply units; and
- updates the relationship information according to the estimated battery state.

* * * * *